July 25, 1961  W. S. DAVISON, JR., ET AL  2,993,516
LEAD-IN WIRE ORIENTING APPARATUS
Filed Aug. 29, 1957  5 Sheets-Sheet 5

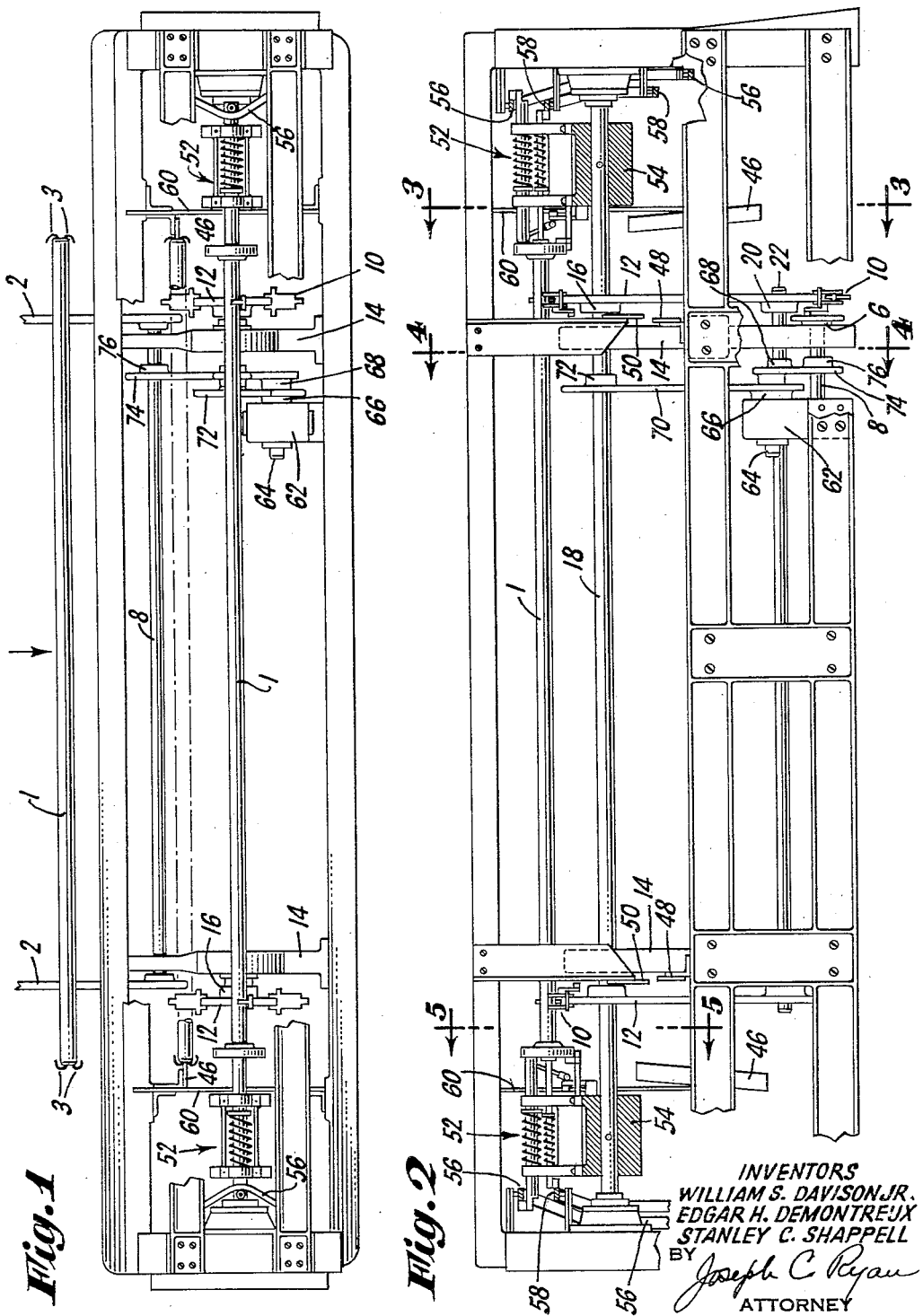

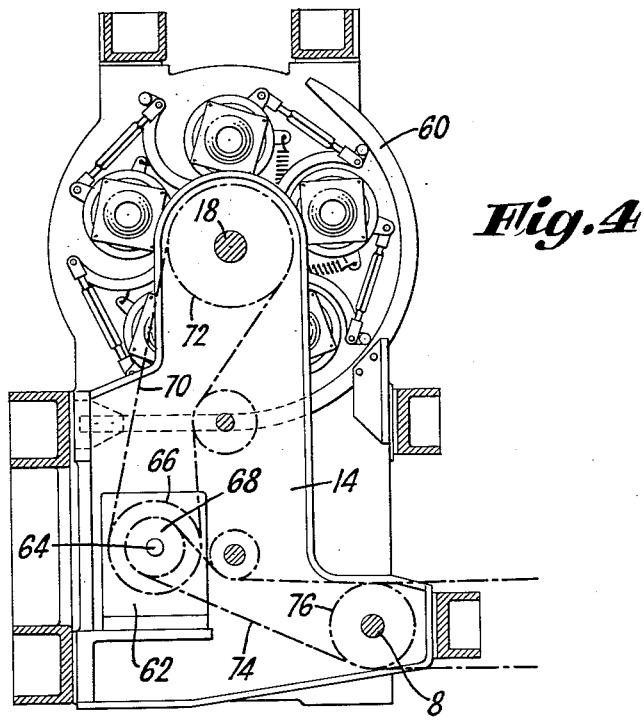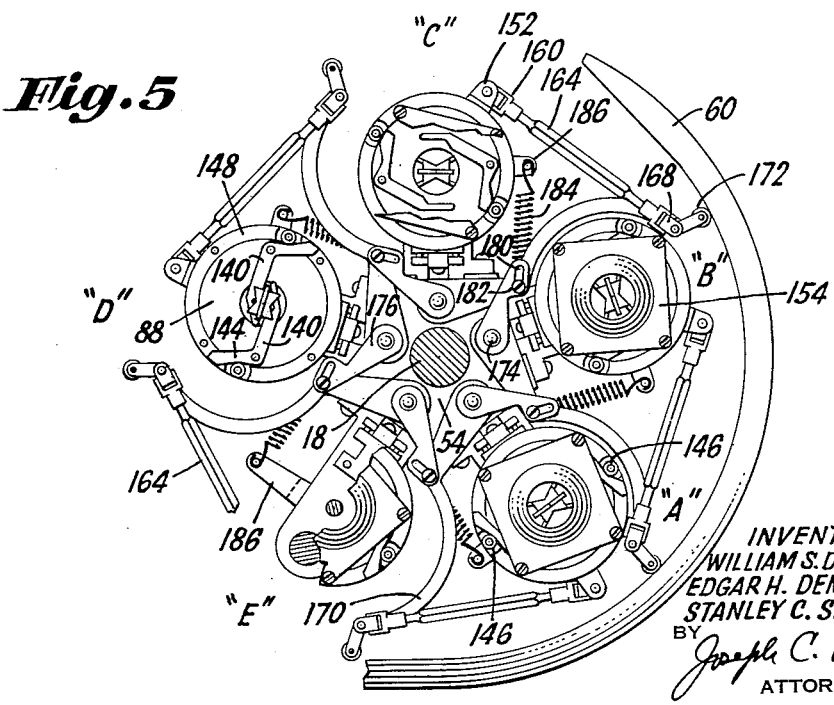

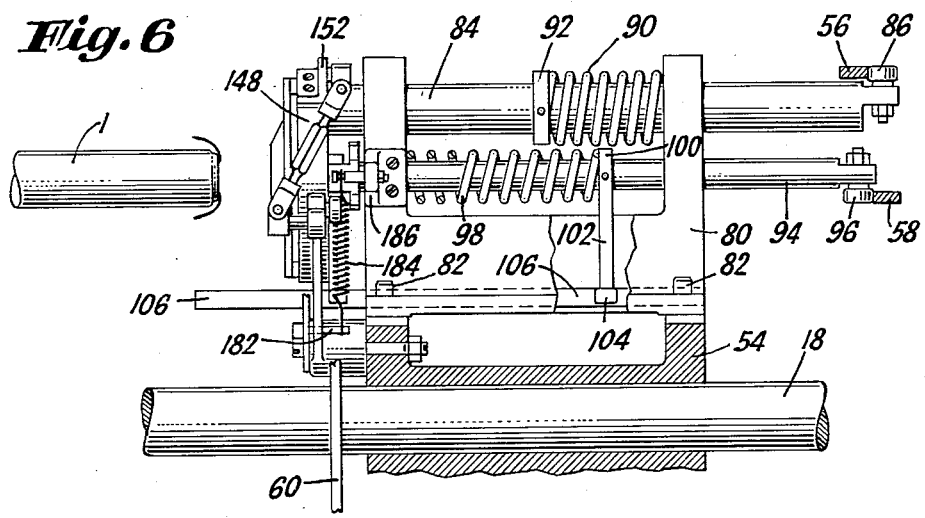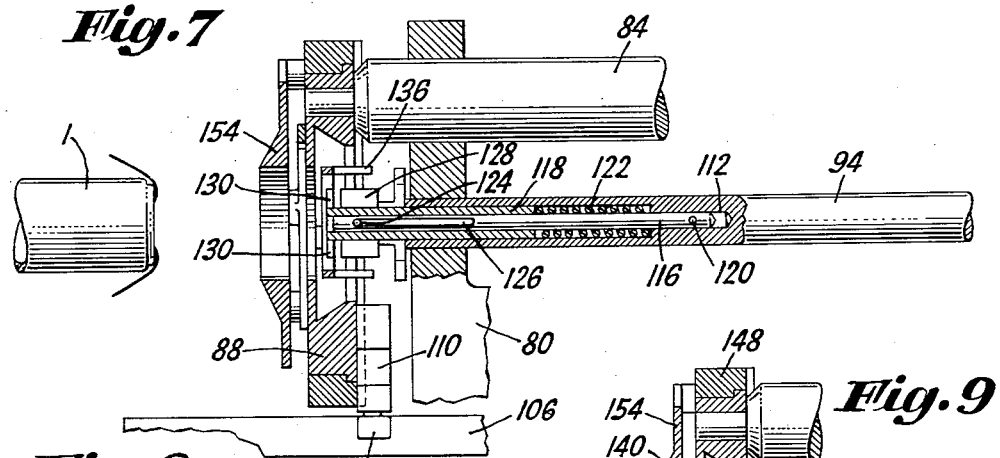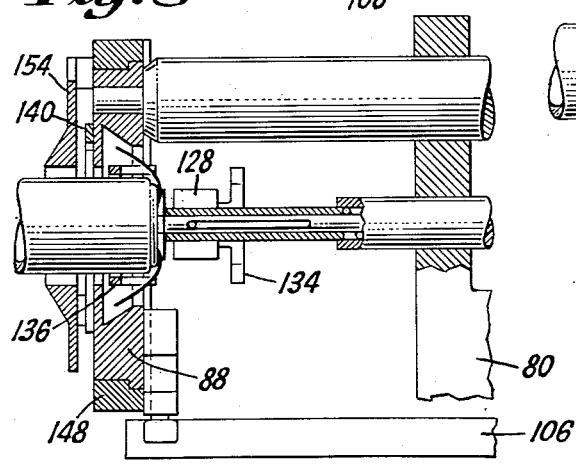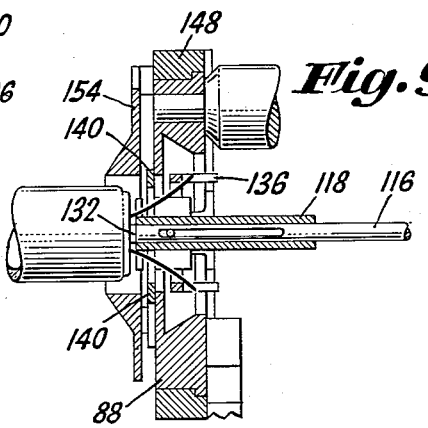

INVENTORS
WILLIAM S. DAVISON JR.
EDGAR H. DEMONTREUX
STANLEY C. SHAPPELL
BY
  Joseph C. Ryan
ATTORNEY

United States Patent Office 2,993,516
Patented July 25, 1961

2,993,516
LEAD-IN WIRE ORIENTING APPARATUS
William S. Davison, Jr., Ipswich, Edgar H. Demontreux, Arlington, and Stanley C. Shappell, West Boxford, Mass., assignors, by mesne assignments, to Sylvania Electric Products Inc., Wilmington, Del., a corporation of Delaware
Filed Aug. 29, 1957, Ser. No. 681,108
6 Claims. (Cl. 140—147)

This invention relates to the manufacture of electrical devices and more particularly to the manufacture of electrical devices having lead-in wires projecting therefrom.

In the manufacture of electric lamps, electric gaseous discharge devices, electron tubes and similar articles, lead-in wires are usually employed as the means through which a source of electrical energy may be connected to certain elements of the article. Usually a substantial number of operations are involved in the manufacture of these articles. The lead-in wires are usually a part of a sub-assembly which, in subsequent operations, is joined to one or more other subassemblies, and the resultant unitary structure is then treated in further operations to effect completion of the manufacture of the article. Since the lead-in wires comprise a part of the work at an early stage in the manufacturing operations, their disposition with respect to one another and with respect to other members of the work becomes important in the execution of subsequent manufacturing operations.

For example, in the manufacture of fluorescent lamps, the lead-in wires are a part of a mount, one of which is sealed to each end of an elongated glass tube to thereby define the gas-tight lamp envelope. During this sealing operation, the lead-in wires must be disposed so that they do not interfere with the quick and easy positioning of the mount on the sealing machine head, such as is shown in FIGURES 9 and 11 of U.S. Patent 2,721,422 for example. Care must also be exercised to make sure that the disposition of the lead-in wires is such that their exposure to the heat of the sealing means is kept at a minimum to prevent contamination thereof or other damage thereto. During the subsequent lamp exhausting and filling operation the lamp electrodes are usually heated electrically, a source of electrical energy being connected thereto through the lead-in wires. Here again, the disposition of the lead-in wires is important in order to insure proper electrical contact for this operation. The lead-in wires are usually spread apart somewhat away from the lamp exhaust tube, such as is shown in FIGURE 9 of U.S. Patent 2,726,799 for example, both to insure proper positioning for electrical contact and to preclude interference with the operation of the exhaust tube tipping device. In the subsequent basing or finishing operation, in which the lead-in wires are threaded through pins in a lamp base which is then secured to each end of the lamp, the lead-in wires must be positioned in axial alignment with the pins of the base in order to be threaded therethrough. Thus the disposition of the lead-in wires for this operation must be altered considerably from the disposition thereof during the lamp exhausting operation just mentioned.

In view of the foregoing, an object of this invention is to orient the lead-in wires of an electrical device.

Another object is to provide an apparatus for orienting the lead-in wires of an electrical device.

A further object is to provide a fully automatic apparatus for orienting the lead-in wires of an electrical device.

A further object is to provide an apparatus for orienting simultaneously the lead-in wires extending from both ends of an electrical device.

Another object is to orient the lead-in wires of an electrical device on a continuous motion machine.

A more specific object of this invention is to provide an apparatus for straightening the lead-in wires of a fluorescent lamp upon completion of the lamp exhausting, filling and tipping operations to obtain proper disposition of the lead-in wires for the base threading operation.

These and other objects, advantages and features, which will be appreciated by those skilled in the art, are attained, in accordance with the principles of this invention, by advancing a lead-in wire orienting head on a continuously moving conveyor into encompassing relationship with respect to an end of an electrical device being carried by a continuous motion conveyor moving in synchronism with the first-mentioned conveyor, and then actuating certain devices which comprise the lead-in wire orienting head while withdrawing the head from encompassing relationship with respect to the end of the electrical device whereby orientation of the lead-in- wires is effected.

In the specific embodiment of the apparatus of this invention illustrated in the accompanying drawings, FIGURE 1 is a plan view of the lead-in wire orienting apparatus and its associated parts, viz., the conveyor for feeding lamps thereto and the conveyor which carries the lamps during the lead-in wire orienting operations.

FIGURE 2 is a side elevational view of the apparatus of FIGURE 1.

FIGURE 4 is a transverse sectional view taken along the line 4—4 of FIGURE 2 showing, in a single dot-dash line, the common drive for both conveyors and the lead-in wires orienting heads, and the relative location of the heads to the main framework of the apparatus and one of the cams which actuates one of the devices of the head.

FIGURE 5 is a transverse sectional view on an enlarged scale, taken along the line 5—5 of FIGURE 2, showing the lead-in wires orienting heads in front elevation, with portions thereof broken away to permit illustration of certain portions thereof normally concealed behind the head face plates.

FIGURE 6 is a side elevational view of one of lead-in wire orienting heads and its associated actuating mechanisms in the normal rest position.

FIGURES 7, 8, 9 and 10 are fragmentary details, partly in section, of one of the lead-in wire orienting heads, showing the relative location of the parts thereof during the progress of the lead-in wire orienting operation.

Figure 3:
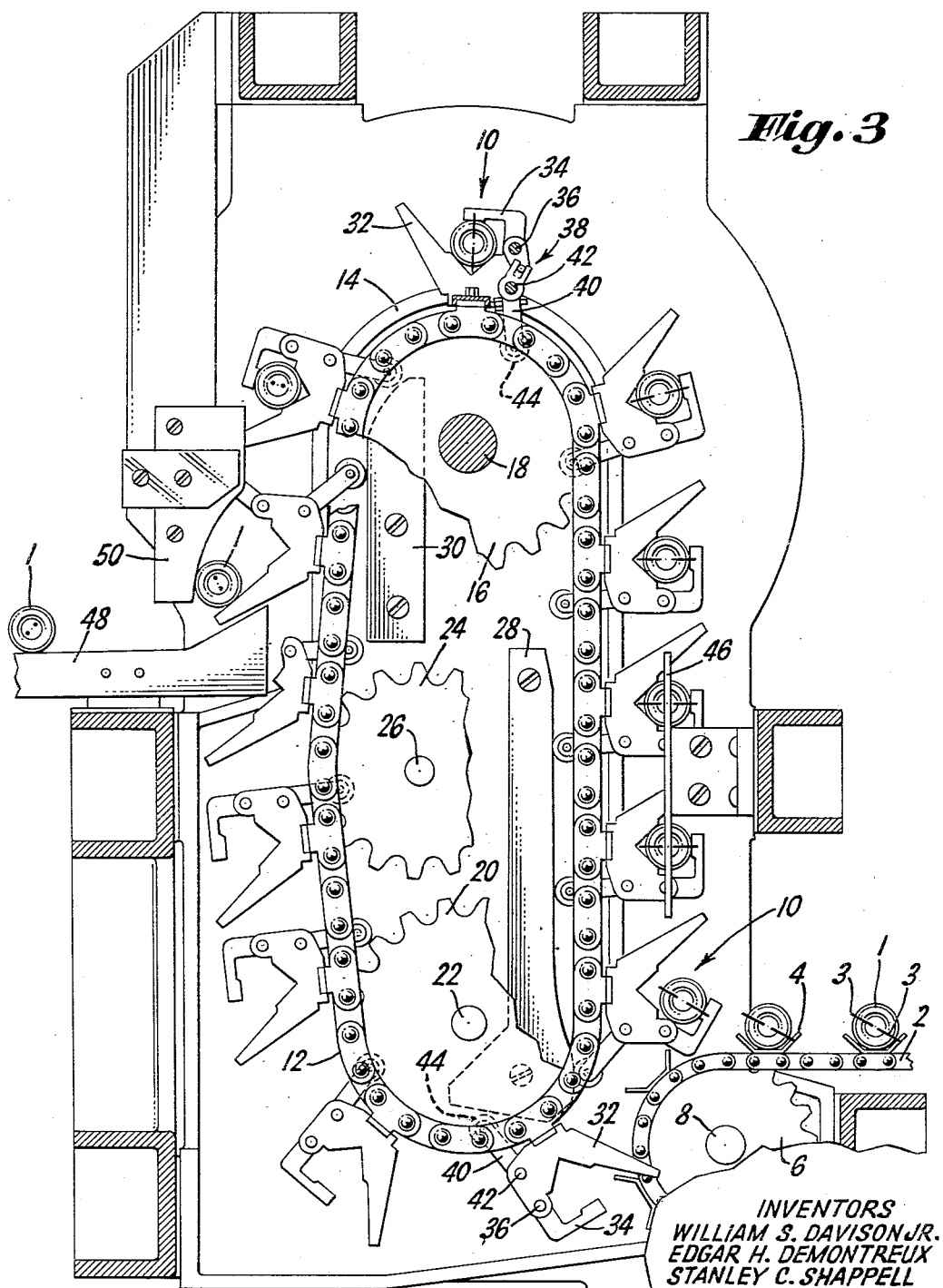
FIGURE 3 is a transverse sectional view taken along line 3—3 of FIGURE 2 showing a portion of the lamp feeding conveyor, the conveyor which carries the lamps during the lead-in wire orienting operations, and the means employed to open and close the lampholders on the second-mentioned conveyor.

Referring now to the drawings, particularly FIGURES 1, 2 and 3 thereof, the framework consists essentially of a plurality of channel iron and angle iron members and castings for providing the primary support for the several operational devices which comprise the lead-in wire straightening apparatus. The individual parts of the framework will be identified specifically, as required, as the description of the apparatus develops. Because of the shape of the work, it will be appreciated from a preliminary examination of FIGURES 1 and 2 that the elongated tubular envelope of the fluorescent lamp 1 must be supported at or near each end thereof at all times. Because of the nature of the operations to be performed thereon, it will be appreciated that similar mechanisms are disposed at or near each end of the lamp. In view thereof, and in order to simplify the description of the specific embodiment of the apparatus, the description will be developed primarily in the singular and reference will be made primarily to mechanisms on one end of the apparatus.

Referring now particularly to FIGURE 3, fluorescent lamp 1, with lead-in wires 3 projecting end-wise therefrom, are fed to the lead-in wire straightening apparatus by a conveyor chain 2, the lamp 1 being disposed in a cradle 4 attached to the chain 2. As the chain 2 moves around sprocket 6 on shaft 8, the lamp 1 rolls out of the cradle 4 and into lampholder 10 mounted on conveyor chain 12. The conveyor chain 12 carries the lampholder 10 through a pre-determined path to permit the several devices which comprise the lead-in wire straightening apparatus to operate on the work. The conveyor chain 12 and its associated parts are supported primarily by or on a casting 14.

The conveyor chain 12 is driven by drive sprocket 16 on drive shaft 18, and meshes with idler sprocket 20 on idler shaft 22 and guide sprocket 24 on shaft 26. A bar cam 28 attached to casting 14 actuates the lampholder 10 at the feeding end, and a bar cam 30 attached to casting 14 effects an opening of lampholder 10 to release the lamp 1 therefrom at the discharge end. The lampholder 10, as will be noted from a partial section thereof at the top center of FIGURE 3, comprises a stationary finger 32 attached to conveyor chain 12 and a rotatable finger 34 pivotally mounted thereon at 36. Actuation of the rotatable finger 34 is effected by a toggle device 38 through a lever 40, pivoted at 42, on which cam follower 44 is supported.

Referring now to the bottom center of FIGURE 3, when the cam follower 44 is deflected by bar cam 28, the lever 40 is deflected thereby and thus actuates the toggle device 38 to effect clockwise rotation of finger 34 and thus open the lampholder 10 for the reception of lamp 1. Immediately after the lampholder 10 receives a lamp 1 from the cradle 4 on the conveyor chain 2, the rotatable finger 34 swings towards the closed position under the influence of bar cam 28. While so supported, the lamp 1 is centered laterally by a pair of fixed angularly disposed guide plates 46 (FIGS. 1, 2 and 3), the lamp being nudged endwise by the guide plates 46 as it is carried passed these members.

If desired, in order to insure a preliminary disposition of the lead-in wires substantially as shown near the guide plate 46 in FIGURE 3, a lamp rotating unit similar to the tube rotating unit 70 in the copending application of Stanley C. Shappell, Serial No. 618,790, filed October 29, 1956, may be employed. Subsequently, the cam follower 44 rides off of bar cam 28 and the spring-loaded rotatable finger 34 snaps closed on the lamp.

Upon completion of the lead-in wire straightening operations, the lamp 1 is discharged onto a track 48, aided by guide 50. Opening of the lampholder 10 to permit the lamp 1 to roll out onto the track 48 is effected by rotation of the finger 34 under the influence of the toggle device 38 as described above and the bar cam 30.

The lead-in wire straightening operation is performed on a lamp 1 by a head, designated generally by the reference number 52 (FIGS. 1 and 2), as the lamp is carried through an operating cycle by a pair of lampholders 10 on conveyor chains 12. In the specific embodiment of the invention illustrated in the accompanying drawing, there are five heads 52 located at one end of the machine framework and five heads 52 located at the other end thereof. The heads 52 at each end of the machine framework are mounted on a pentagonal block 54 attached to drive shaft 18. Most of the operational devices of the head 52 are cam actuated. Although these devices and their operation will be described below in connection with the description of some of the more detailed figures of the drawings, their cams will be identified briefly in FIGURES 1 and 2, cams 56 and 58 are attached to the ends of the machine framework and cam 60 is attached to the sides thereof.

The conveyor chain 2 which feeds the lamps and the conveyor chain 12 which carries the lamps through an operating cycle of the lead-in wire straightening apparatus are driven from a common source, viz., the motor 62 (FIGS. 1, 2 and 4). The drive shaft 64 of motor 62 is provided with a sprocket 66 and a sprocket 68. Chain 70 connects sprocket 66 to sprocket 72 on drive shaft 18. Chain 74 connects sprockets 68 to sprocket 76 on feeding conveyor drive shaft 8.

The head 52, as shown in FIGURES 6 and 7, comprises a head casting 80, attached to the pentagonal block 54 by screws 82, and a plurality of operational devices supported thereby. A head housing rod 84, supported by and reciprocable within the head casting 80, is provided with a cam follower 86 at one end thereof and a head housing 88 attached thereto at the other end thereof. The head housing rod 84 is spring loaded by spring 90 disposed thereon between a collar 92 pinned thereto and an adjacent face of head casting 80. A rod 94, supported by and reciprocable within the head casting 80, is provided with a cam follower 96 at one end thereof. The rod 94 is spring loaded by spring 98 disposed thereon between a collar 100 pinned thereto and an adjacent face of head casting 80. The collar 100 is provided with a bifurcated depending leg 102 to which a pair of guide rolls 104 are attached. The guide rolls 104 ride on opposite faces of a guide bar 106 attached to the base of head casting 80, thus providing a means for preventing rotation of rod 94 particularly during its reciprocation. Guide rolls 108, depending from plate 110 (FIGS. 7 and 11) attached to a face of head housing 88, also ride on opposite faces of guide bar 106 for a similar purpose, i.e., to prevent rotation of head housing 88 during reciprocation of head housing rod 84 and also during the operation of the head 52.

As was mentioned immediately above, the rod 94 is provided with a cam follower 96 at one end thereof. The other end of rod 94 is bored and counterbored to define chambers 112 and 114 therein for stop rod 116 and anvil rod 118 respectively (FIG. 7). The stop rod 116 is pinned near the inner end thereof at 120 to rod 94. The anvil rod 118 is reciprocable within the chamber 114 in rod 94 and is slidable on stop rod 116. The anvil rod 118 is spring loaded by spring 122 disposed within the chamber 114 between the inner end of anvil rod 118 and the inner end of the chamber 114. Prevention of rotation and limitation of the length of the reciprocating stroke of anvil rod 118 is effected by a pin 124 projecting therefrom which rides in an elongated slot 126 in the stop rod 116. As may be seen more clearly in FIGURE 12, an anvil, identified generally by the reference number 127, mounted on and preferably formed integral with anvil rod 118, comprises rear block 128, center block 129 and a pair of front blocks 130. The apexes of the converging surfaces of the rear block 128, the center block 129 and the front blocks 130 define straight lines. The blocks 130 are spaced from one another a distance sufficient to permit the stop rod 116 to project freely therebetween and to define a seat during certain portions of the operating cycle of the apparatus for a stop plate 132 mounted on the free end of stop rod 116. The anvil 127 has a pair of laterally projecting wings 134 attached to each side of the rear block 128 thereof.

Figure 11:
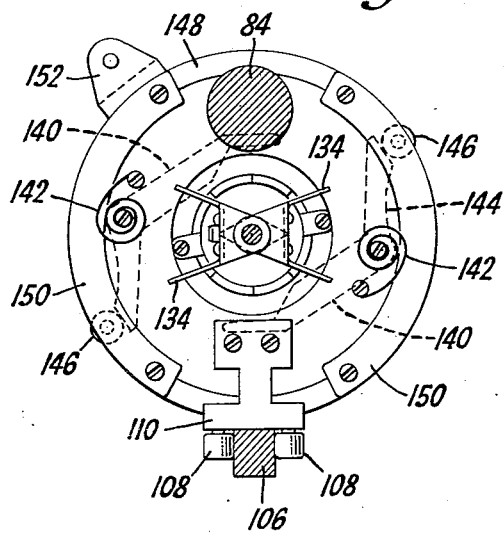
FIGURE 11 is a rear view of one of the lead-in wire orienting heads.
Figure 12:
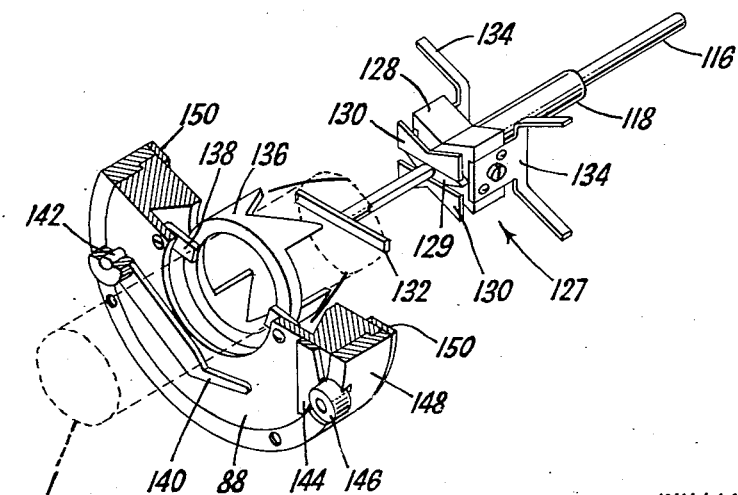
FIGURE 12 is an exploded perspective view of a lead-in wire orienting head, partly cut away to show more detail. It should be noted that the several devices which comprise the head assembly are never located in the exact relative position as shown in this figure, liberty having been taken in this view to obtain maximum illustration of many of the details.

The parts of the apparatus immediately associated with the head housing 88 will now be described, reference being made to FIGURES 6 and 7 for general orientation and FIGURES 11 and 12 for details. As was mentioned above, the head housing 88 is attached to an end of head housing rod 84. The head housing 88 is provided with a central aperture large enough to permit the free extension therethrough of an end of a fluorescent lamp such as the lamp 1 shown in phantom in FIGURE 12. A guide ring 136, through which lamp 1 may also extend freely, is attached by means of tabs 138 to the inner face of the head housing 88. The outer face of head housing 88 has a pair of spring-loaded fingers 140 pivotally mounted thereon at 142, one of these fingers being shown in solid in FIGURE 12, and both of them being shown in phantom in FIGURE 11. Each of the fingers 140 is provided with an extension 144, formed integral therewith, which defines a cam surface engaged by a cam follower 146. The pair of cam followers are mounted on a rotatable ring 148 which encircles head housing 88 and is maintained in position thereon by arcuate retaining plates 150. The rotatable ring 148 is provided with a projecting ear 152 (FIG. 11) to which certain mechanisms to be described below are connected for effecting rotation thereof. Although only two fingers 140 are shown in the specific embodiment of the invention illustrated in the accompanying drawings, it will be appreciated particularly as the operation thereof is described below, that four fingers may be employed if desired. The head housing 88 is provided with a face plate 154 attached thereto and spaced therefrom to protect the fingers 140 which lie therebetween.

The means employed to effect rotation of the rotatable ring 148 and actuation of the spring-loaded fingers 140 will now be described, reference being made primarily to FIGURES 4 and 5 in which five head assemblies, identified generally in FIGURE 5 as head assemblies A, B, C, D and E, are shown. Since these heads are structurally the same, only one will be described, reference being made particularly to head C in FIGURE 5. The projecting ear 152 on rotatable ring 148 is connected, through universal joint 160 to one end of rod 164. The other end of rod 164 is provided with a universal joint 168. One end of a lever 170, provided with a cam follower 172 which rides on cam 60, is connected to universal joint 168. The other end of lever 170 is pivotally mounted at 174 on block 54 on drive shaft 18. One end of a safety link 176 is attached to block 54 at 174, the other end thereof being provided with an elongated slot 180 through which a bolt 182 secured to lever 170 extends. One end of a spring 184 is connected to the bolt 182, the other end thereof being connected to a bracket 186 attached to head casting 80 (FIG. 6).

Counter-clockwise rotation (as viewed in FIG. 5) of ring 148, induced by spring 184 when cam follower 172 rides off of track 60, displaces each of the cam followers 146 mounted thereon with respect to each of the extensions 144 of fingers 140 with which they are associated, the cam followers 146 moving into the arched portions of the members 144 and thus permitting the spring-loaded fingers 140 to advance to the closed position with respect to the anvil and the lamp lead-in wires as shown on head D (FIG. 5). Clockwise rotation of ring 148 to swing the fingers 140 to their open position upon completion of the lead-in wire straightening operation is effected when cam follower 172 rides upon cam 60.

The operation of the lead-in wire straightening apparatus will now be described, reference being made initially to FIGURES 1, 2 and 3. A fluorescent lamp 1, having a pair of lead-in wires 3 projecting from each end thereof, carried by cradles 4 on conveyor chains 2, is fed thereby to a pair of lampholders 10 on conveyor chains 12, the speed of the feeding and receiving conveyor chains being synchronized to insure the presence in proper position of a pair of lampholders 10 to receive the lamp as it rolls out of the cradles 4. Each of the fingers 34 of the cooperating pair of lampholders 10 is partially closed to effect retention of the lamp in the lamp holders 10 as the cam follower 44 rides up along the inclined surface of bar cam 28. As the lamp 1 is carried upwardly (FIG. 3) it moves past the inclined centering guide plates 46 which nudge the lamp end-on to effect a predetermined lateral positioning thereof. The cam follower 44 then rides off of cam 28 and the finger 34 swings to the fully closed position to securely grip the lamp. The lamp is now in position to have the lead-in wires thereof straightened.

The first step involved in effecting lead-in wire straightening is advancement of certain mechanisms of the pair of cooperating heads 52 at each end of the machine into encompassing relationship with respect to the ends of the lamp, the relative disposition of a head 52 and an end of lamp 1 being shown in FIGURE 6. With the lamp 1 in axial alignment with a pair of cooperating heads 52 at each end thereof and the lamp and the heads being advanced synchronously by the common drive shaft 18, the head housing rods 84 and the rods 94 are advanced toward the adjacent ends of the lamp. Referring now to FIGURE 6, the spring 90 advances the head housing rod 84, the cam 56, and cam follower 86 projecting from an end of rod 84, controlling the length of the forward stroke. The cam 58, through the cam follower 96, drives the rod 94 forward and, in so doing, effects compression of spring 98.

The relative position of the several devices which operate on the lead-in wires 3 at the end of the forward stroke of rods 84 and 94 is shown in FIGURE 8. The face plate 154, the head housing 88 and the guide ring 136 have moved into encompassing relationship with respect to the end of the lamp, and the stop plate 132 on the end of a stop rod 116 has been advanced into abutting relationship with respect to the end of the lamp. The forward stroke of the rod 94 is shorter than the forward stroke of the head housing rod 84, as will be noted from an examination of the relative disposition of some of the members as shown in FIGURES 6 and 7 on the one hand and FIGURE 8 on the other hand. For example, a substantial part of rear block 128 is disposed within guide ring 136 in FIGURE 7 whereas it is disposed somewhat to the rear thereof as shown in FIGURE 8.

The return stroke of the head housing rod 84 is now initiated by its cam follower 86 and cam 56. The relative disposition of the several devices which cooperate to effect a straightening of the lead-in wires 3 of the lamp 1 at the end of what may be called the first phase of the return stroke of the head housing rod 84 is shown in FIGURE 9. The head housing 88 and the several members attached thereto or supported thereby, including the guide ring 136, have backed off from the lamp 1 and, in doing so, the lead-in wires 3 have been deflected, toward one another and nearer a disposition in the same vertical plane, by the guide ring 136. During this first phase of the return stroke of head housing rod 84, the rod 94 is maintained in its full forward position.

The second phase of the return stroke of head housing rod 84 is now initiated. Since the wings 134 projecting from block 128 now abut the rear face of head housing 88, the wings 134 and all parts attached thereto directly or indirectly are pushed rearwardly thereby. Thus the wings 134, the anvil 127 and the anvil rod 118 are all caused to move rearwardly, the rod 118 telescoping within the chamber 114 in rod 94 (FIG. 7) and compressing spring 122. Since the rod 94 has not yet started its return stroke, and since stop rod 116 is pinned thereto at 120, the stop rod 116 remains in its fully forward position with the stop plate 132 continuing in abutting relationship with respect to the end of the lamp 1 (FIG. 10), and the anvil rod 118 sliding along stop rod 116 with the pin 124 projecting from anvil rod 118 traversing the elongated slot 126 in stop rod 116.

Figure 10:
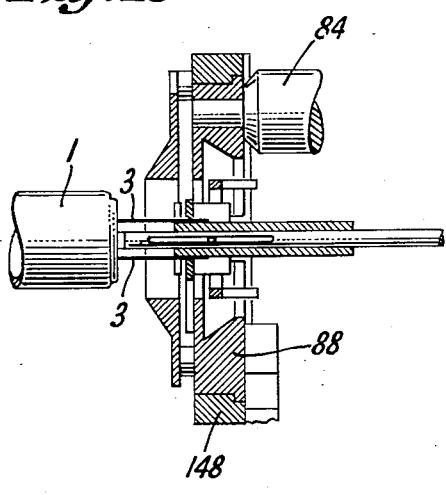

It will be noted from an examination of FIGURE 10 that as the guide ring 136 and the anvil assembly back off from the lamp 1, the lead-in wires 3 are drawn closer to one another and nearer a parallel disposition (compare FIGS. 9 and 10), with the lead-in wires being deflected by the guide ring 136 into engagement with the top and bottom working surfaces of the anvil 127. At this same time, i.e., at the start of the second phase of the return stroke of head housing rod 84, the ring 148 on the head housing 88 is rotated by lever 170 (FIG. 5) to effect displacement of the pair of cam followers 146 on ring 148 from the position occupied by them in head C of FIG. 5, thus permitting the spring-loaded fingers 140 to advance to their closed position shown in head D lying between blocks 130 and block 128 of anvil 127 and in engagement with lead-in wires 3 (FIG. 10).

The return stroke of the head housing rod 84 continues with the head housing 88 carrying the anvil assembly with it. During this portion of the return stroke, the lead-in wires 3 lie across the working surfaces of the anvil 127 and are confined along the lines defined by these work surfaces by the spring-loaded fingers 140. When the pin 124 projecting from anvil rod 118 approaches the end of the elongated slot 126 within which it rides, the head housing 88 will have backed off to a position where the several devices operating on the lead-in wires will have been withdrawn from engagement therewith, thus completing the lead-in wire straightening operation. The rod 94 is then retracted, taking with it the stop plate 132 from end-on engagement with the lamp. Upon opening of lampholder 10 (FIG. 3) the lamp rolls down the discharge track 48. The head housing rod 84 and the rod 94 complete their return stroke to the starting position as shown in FIGURES 7. The fingers 140 (FIG. 5) which had been closed on the lead-in wires as shown at head D in FIGURE 5 are swung to their open position when cam follower 172 rides up on track 60 to actuate lever 170 to effect rotation of ring 148. Thus the several operating devices of the lead-wire straightening apparatus have been returned to their rest position and head A is ready to receive another lamp and effect a straightening of the lead-in wires thereof.

What we claim is:

1. Apparatus for orienting a pair of lead-in wires extending randomly from an end of a tubular electrical device, said apparatus comprising: means for supporting said electrical device; an orienting head, including an anvil and an adjacent guide ring formed to encircle the anvil with said ring and anvil being in axial alignment with one another and in axial alignment with said tubular electrical device but spaced from said end thereof and from said lead-in wires; means for advancing said guide ring away from said anvil into encircling relationship with respect to said end of said device and beyond said lead-in wires to cause said projecting lead-in wires to lie between said guide ring and said anvil; and means for retracting said guide ring from encircling relationship with respect to said end of said device and into encircling relationship with respect to said anvil whereby said lead-in wires lying therebetween are deflected by said guide ring onto said anvil.

2. Apparatus for orienting a pair of lead-in wires extending randomly from an end of a tubular electrical device, said apparatus comprising: a conveyor for carrying said electrical device; an orienting head disposed adjacent to said conveyor, said head including an anvil and an adjacent guide ring formed to encircle the anvil with said ring and anvil being in axial alignment with one another and in axial alignment with said tubular electrical device but spaced from said end thereof and from said lead-in wires; driving means for advancing said conveyor and said head in synchronism; means for advancing said guide ring away from said anvil into encircling relationship with respect to said end of said device and beyond said lead-in wires to cause said projecting lead-in wires to lie between said guide ring and said anvil; and means for retracting said guide ring from encircling relationship with respect to said end of said device and into encircling relationship with respect to said anvil whereby said lead-in wires lying therebetween are deflected by said guide ring onto said anvil.

3. Apparatus for orienting a pair of lead-in wires extending randomly from an end of a tubular electrical device, said apparatus comprising: a conveyor for carrying said electrical device; an orienting head, including an anvil and an adjacent guide ring formed to encircle the anvil with said ring and anvil being in axial alignment with one another, disposed adjacent to said conveyor but spaced therefrom and from said lead-in wires of said electrical device carried thereby; means for actuating said conveyor to advance an electrical device disposed thereon into axial alignment with said head; means for advancing said guide ring away from said anvil into encircling relationship with respect to said end of said device and beyond said lead-in wires to cause said projecting lead-in wires to lie between said guide ring and said anvil; and means for retracting said guide ring from encircling relationship with respect to said end of said device and into encircling relationship with respect to said anvil whereby said lead-in wires lying therebetween are deflected by said guide ring onto said anvil.

4. Apparatus for orienting a pair of lead-in wires extending randomly from an end of a tubular electrical device, said apparatus comprising: means for supporting said electrical device; an orienting head in axial alignment with said tubular electrical device but spaced from said end thereof and from said lead-in wires, said orienting head including a head housing having a central aperture and an anvil in axial alignment therewith, said head housing having a guide ring concentric therewith and attached thereto on the inner face thereof, said guide ring being disposed adjacent to said anvil and formed to encircle said anvil, and a pair of fingers pivotally mounted on the outer face thereof and transversely of the axis thereof said outer face being the nearer face to said end of said device, and said head housing being between said end of said device and said anvil; means for advancing said head housing including said guide ring away from said anvil into encircling relationship with respect to said end of said device and beyond said lead-in wires extending therefrom to cause said projecting lead-in wires to lie between said guide ring and said anvil; means for retracting said head housing from encircling relationship with respect to said end of said device and into encircling relationship with respect to said anvil whereby said lead-in wires lying therebetween are deflected by said guide ring onto said anvil; and means for moving said pair of fingers into engagement with said lead-in wires and said anvil whereby said lead-in wires are constrained between said fingers and said anvil during at least a portion of the retraction of said head housing.

5. Apparatus for orienting a pair of lead-in wires extending randomly from an end of a tubular electrical device, said apparatus comprising: a conveyor for carrying said electrical device; an orienting head disposed adjacent to said conveyor and in axial alignment with said tubular electrical device but spaced from said end thereof and from said lead-in wires, said orienting head including a head housing having a central aperture and an anvil in axial alignment therewith, said head housing having a guide ring concentric therewith and attached thereto on the inner face thereof, said guide ring being disposed adjacent to said anvil and formed to encircle said anvil, and a pair of fingers pivotally mounted on the outer face thereof and transversely of the axis thereof, said outer face being the nearer face to said end of said device, and said head housing being between said end of said device and said anvil; driving means for advancing said conveyor and said head in synchronism; means for advancing said head housing including said guide ring away from said anvil into encircling relationship with respect to said end of said device and beyond said lead-in wires extending therefrom to cause said projecting lead-in wires to lie between said guide ring and said anvil; means for retracting said head housing from encircling relationship with respect to said end of said device and into encircling relationship with respect to said anvil whereby said lead-in wires lying therebetween are deflected by said guide ring onto said anvil; and means for moving said pair of fingers into engagement with said lead-in wires and said anvil whereby said lead-in wires are constrained between said fingers and said anvil during at least a portion of the retraction of said head housing.

6. Apparatus for orienting a pair of lead-in wires extending randomly from an end of a tubular electrical device, said apparatus comprising: a conveyor for carrying said electrical device; an orienting head disposed adjacent to said conveyor but spaced therefrom and from said lead-in wires of said electrical device carried thereby, said orienting head including a head housing having a central aperture and an anvil in axial alignment therewith, said head housing having a guide ring concentric therewith and attached thereto on the inner face thereof, said guide ring being disposed adjacent to said anvil and formed to encircle said anvil, and a pair of fingers pivotally mounted on the outer face thereof and transversely of the axis thereof, said outer face being the nearer face to said conveyor, and said head housing being between said conveyor and said anvil; means for actuating said conveyor to advance an electrical device disposed thereon into axial alignment with said head; means for advancing said head housing including said guide ring away from said anvil into encircling relationship with respect to said end of said device and beyond said lead-in wires extending therefrom to cause said projecting lead-in wires to lie between said guide ring and said anvil; means for retracting said head housing from encircling relationship with respect to said end of said device and into encircling relationship with respect to said anvil whereby said lead-in wires lying therebetween are deflected by said guide ring onto said anvil; and means for moving said pair of fingers into engagement with said lead-in wires and said anvil whereby said lead-in wires are constrained between said fingers and said anvil during at least a portion of the retraction of said head housing.

References Cited in the file of this patent

UNITED STATES PATENTS

| | | |
|---|---|---|
| 1,853,947 | Von Der Poel et al. | Apr. 12, 1932 |
| 2,721,373 | Midgley | Oct. 25, 1955 |
| 2,721,584 | Midgley | Oct. 25, 1955 |